United States Patent [19]
Hancock et al.

[11] Patent Number: 5,724,227
[45] Date of Patent: Mar. 3, 1998

[54] ROTATABLE DRIVE BAY MODULE FOR A COMPUTER CABINET

[75] Inventors: Ronald Hancock; Jeffrey Schindler, both of Sioux City, Iowa; Theodore W. Waitt, Dakota Dunes, S. Dak.

[73] Assignee: Gateway 2000, Inc., North Sioux City, S. Dak.

[21] Appl. No.: 617,619

[22] Filed: Mar. 19, 1996

[51] Int. Cl.$^6$ .................. G06F 1/16; H05K 5/02
[52] U.S. Cl. .......................... 361/685; 361/725
[58] Field of Search ............ 364/708.1; 361/683, 361/685, 724–727; 312/223.2

[56] References Cited

U.S. PATENT DOCUMENTS

| | | | |
|---|---|---|---|
| 4,853,838 | 8/1989 | Westermann | 361/725 X |
| 4,979,909 | 12/1990 | Andrews | 361/685 X |
| 5,051,868 | 9/1991 | Leverault et al. | 361/685 |
| 5,077,722 | 12/1991 | Geist et al. | 369/75.1 |
| 5,138,525 | 8/1992 | Rodriguez | 361/724 X |
| 5,175,670 | 12/1992 | Wang | 361/685 X |
| 5,208,722 | 5/1993 | Ryan et al. | 360/99.01 |
| 5,227,954 | 7/1993 | Twigg | 361/685 |
| 5,235,493 | 8/1993 | Yu | 361/685 |
| 5,248,193 | 9/1993 | Schlemmer | 312/223.2 |
| 5,262,923 | 11/1993 | Batta et al. | 361/685 |
| 5,333,097 | 7/1994 | Christensen et al. | 361/685 |
| 5,351,176 | 9/1994 | Smith Stephen W. et al. | 361/681 |
| 5,379,184 | 1/1995 | Barraza et al. | 361/685 |
| 5,513,068 | 4/1996 | Girard | 361/685 |
| 5,546,277 | 8/1996 | Zandbergen | 361/726 |

*Primary Examiner*—Michael W. Phillips
*Attorney, Agent, or Firm*—Schwegman, Lundberg, Woessner & Kluth, P.A.

[57] ABSTRACT

A drive bay module for a computer cabinet holds multiple peripheral drives. The drive bay module is easily uncoupled and rotated within the computer cabinet so that the drives remain in a upright orthogonal orientation whether the cabinet is positioned vertically or horizontally and the user does not have to rotate each individual drive separately. In addition, the drive bay module can be positioned toward either end of the computer cabinet. In an alternate embodiment, the drive bay module can be positioned and secured at any one of a plurality of angles within the receiving bay.

5 Claims, 4 Drawing Sheets

ROTATABLE DRIVE BAY MODULE FOR A COMPUTER CABINET

FIELD OF THE INVENTION

The present invention is related to personal computer systems and in particular to a computer peripheral enclosure adaptable to multiple configurations.

BACKGROUND OF THE INVENTION

Personal computer cabinets are generally positioned either horizontally (desktop models) or vertically (tower units), and some cabinets are designed to be stable in either configuration. However, the orientation of the drives for removable mass storage media, such as floppy disks, CD ROM's, or tapes, is usually fixed in the cabinet at the time of assembly and the drives cannot be rotated if the user needs to place a desk top model vertically next to a desk or to use a tower unit horizontally on a desk. As a result, the storage media must be inserted or removed from the drive at a 90° angle from the standard loading position. While most removable media drives may be rotated 90° and still function, the normal orientation of the drive should be maintained if possible. Other drives, such as CD ROM drives, are usually designed and manufactured to function only when positioned horizontally. Although fixed disk drives will operate in any orientation, fewer errors occur when the drives remain in the orientation in which they were formatted, and designed to operate in. Therefore, changing the orientation of the computer presents a choice to the user: maintain the original orientation of the cabinet and tolerate inconvenient access to removable storage, or reorient the cabinet and risk drive errors or outright failure.

Because currently the drives must be fastened individually into the computer cabinet, the computer manufacturer must provide the appropriate attachment hardware to mount the drives. In the present art, this hardware is built into the cabinet in one orientation if the cabinet is to be a desk top unit and in another if it is to be a tower unit, and cannot be rotated. Thus, the manufacturer must chose between maintaining both a desk top cabinet and a tower cabinet in inventory resulting in increased inventory costs, or only offering one type of cabinet, limiting the user's choice of configurations and potentially reducing sales income.

One solution to the problem of reorienting a computer cabinet containing a single fixed drive is to place the fixed drive in a cubical module that is rotated within a receiving bay. The cubical module has a square cross-section so that the drive may maintain one orientation whether the cabinet is vertical or horizontal. Providing an individual cubical module for each drive is not a viable solution for drives for removable mass storage media, however, as a computer normally has several such drives and the user would have to dismount and remount each drive separately, a time-consuming and somewhat difficult task. In addition, such drives are rectangular in cross-section and enclosing each one in a cubical module would result in wasted space in the module and in the receiving bay of the cabinet. The current standard size computer cabinet is tightly packed with components so this solution with its unusable space would require increasing the footprint of the cabinet in order to hold the number of drives commonly configured. Therefore, the benefits of providing a separate, cubical module for each removable media drive are outweighed by the drawbacks associated with such a solution.

Personal computer users demand flexible systems that respond to their needs quickly and easily. In particular, users require the ability to reorient their computer cabinet in response to changing needs, rooms, and/or furniture without worrying whether the new position will reduce the reliability of the drive units. No existing solution addresses these needs with a quick and simple mechanism that maintains the drives in their preferred orientation regardless of the position of the computer while simultaneously conserving space within the cabinet. In addition, the optimal solution to this problem should also reduce the inventory costs of the computer manufacturer that utilizes it by allowing one cabinet to be used for both tower and desk top configurations.

SUMMARY OF THE INVENTION

The present invention overcomes the problems of permanently fixing the orientation of drive units discussed above by providing a drive bay module that holds multiple peripheral drives and is easily rotated and positioned within the computer cabinet so that the drives remain in a upright orthogonal position whether the cabinet is positioned vertically or horizontally.

The drive bay module is enclosed on four sides with an open front and back. The front opening is substantially square. The drives are mounted in the module and the module is fastened within a receiving bay in the computer cabinet. In one embodiment, the drives are secured in the module by fastening the drive mounting connectors provided by the drive manufacturer with slots formed in the sides of the module. Slots are used to allow for adjustment for minor variations in drive units. Furthermore, support brackets are molded into the sides of the module and positioned to support the drives in an orthogonal orientation relative to the sides of the computer cabinet when the drives are placed upright in the module.

The drive bay module itself is secured in the computer cabinet by means of a flange on the front opening of the module, the flange being perpendicular to the sides of the module. The flange overlaps and is flush to a receiving bay in the cabinet and contains a series of openings that match openings arranged around the receiving bay. The drive bay module is then screwed, or otherwise secured with reusable fasteners, into place within the cabinet. The openings in the flange and around the receiving bay are arranged so that they line up when the drive bay module is positioned within the receiving bay in any orthogonal orientation relative to the side panels of the computer cabinet. Thus, in a cabinet having a rectangular cross section with the receiving bay positioned adjacent to one of the shorter pair of side panels, the invention allows the drive bay module to be positioned in the upper portion of the cabinet for a standard tower configuration, in the lower portion of the cabinet for a bookshelf tower configuration, or at either end of the cabinet for a desktop configuration.

The drive bay module is designed to hold multiple drives, with the number and type of drives determined by the size and positioning of the slots and support brackets. In one configuration, the module holds four half height drives, and the slots and support brackets are arranged within the module to permit three 5.25" half height drives and one 3.5" half height drive to be mounted therein.

Alternatively, the front opening of the drive bay module is substantially rectangular with the longer pair of the sides of the module sized to fit into a receiving bay with a substantially square mouth. The rectangular module is secured in place in the receiving bay with a flange in the same fashion as the square module and can be positioned in the same orthogonal orientations.

Another option creates a substantially circular mouth in the receiving bay. The circular mouth permits either a square drive bay module or a rectangular drive bay module to be positioned and secured at various angles within the mouth by lining up openings in a flange on the module with arcuate slots in the computer cabinet.

This invention thus fulfills the needs described above. The user can change the orientation of the computer cabinet yet retain the upright orthogonal orientation of the drives by also rotating the drive bay module within the cabinet. The repositioning is accomplished quickly and easily since the drive bay module is fastened to the receiving bay in the cabinet by screws or other reusable fasteners. The computer manufacturer also benefits from this invention since it can maintain one computer cabinet in inventory capable of being assembled in four different configurations. The manufacturer thus saves inventory costs without restricting the customer's configuration choices.

DESCRIPTION OF THE EMBODIMENTS

In the following detailed description of the embodiments, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the present inventions. The following detailed description is, therefore, not to be taken in a limiting sense, and the scope of the present inventions is defined only by the appended claims.

Numbering in the Figures is usually done with the hundreds digits corresponding to the figure number, with the exception that the same components may appear in multiple figures identified by the same number.

Figure 1:
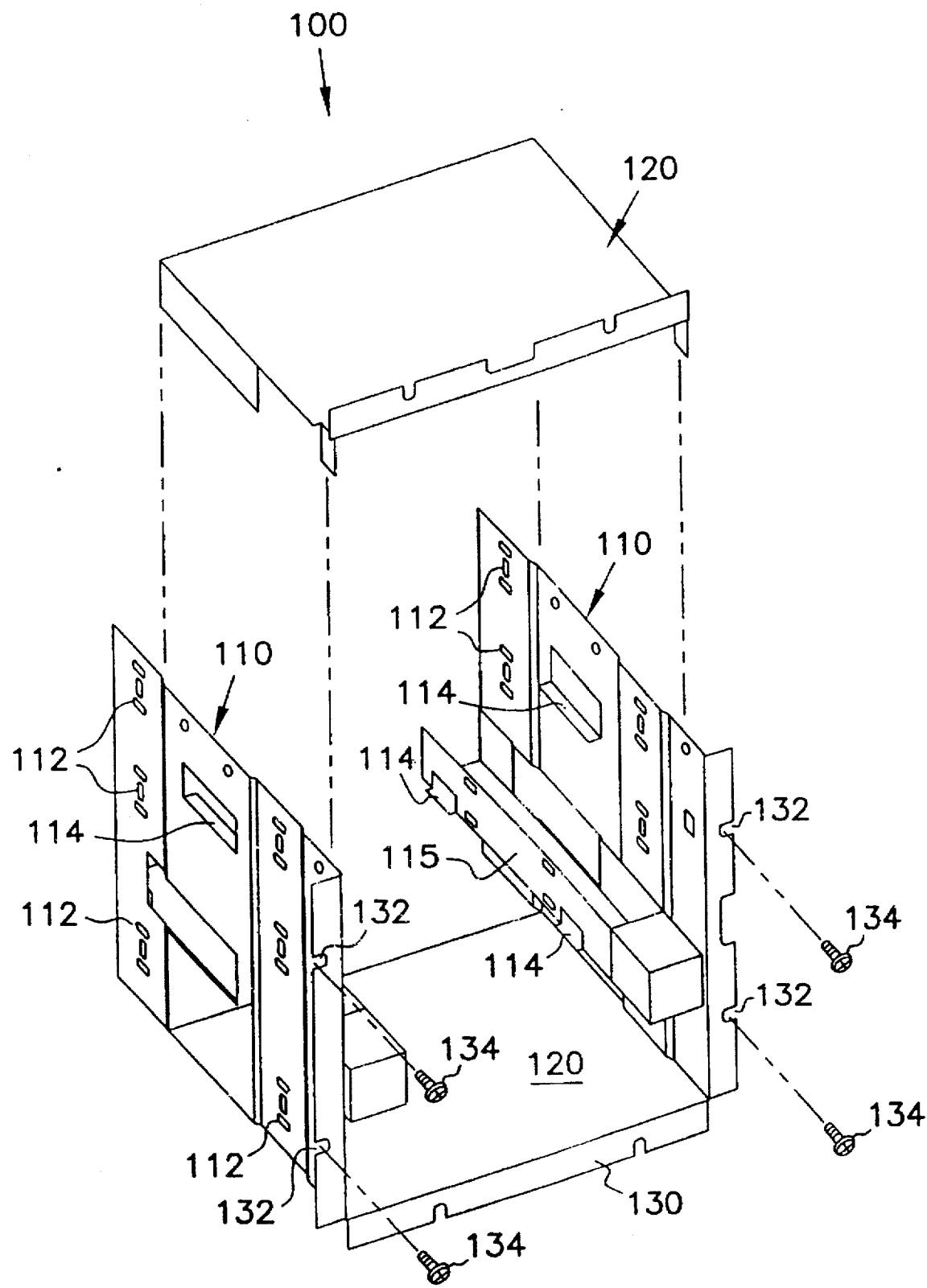
FIG. 1 is a exploded perspective view of a computer drive bay module designed to hold multiple peripheral drive units.

FIG. 1 shows an exploded view of a computer drive bay module for holding multiple peripheral drive units according to the present invention. The drive bay module 100 comprises four steel plates fastened together to form two pairs of opposing sides 110 and 120 leaving the from and the back of the module 100 open. The pairs of opposing sides 110 and 120 are arranged so that the front of the module 100 is substantially square. Mounting hardware positioned on the first pair of opposing sides 110 secures the drive units in the module. The arrangement of the mounting hardware defines "unit bays" (shown in FIGS. 2A, 2B and 2C) within the module and determines the number and type of drive units that can be secured therein. One embodiment of the mounting hardware is shown in FIG. 1 and comprises slots 112 and steel support brackets 114. The slots 112 are stamped, and the support brackets 114 are stamped and folded, into the first pair of opposing sides 110 as part of the manufacturing process of the steel plates. The slots 112 and the support brackets 114 conform to industry standard size factors. In one alternate embodiment, the slots 112 and the support brackets 114 are arranged so that the module is partitioned into three 5.25" half height unit bays and one 3.5" unit bay. Because the 3.5" drive is smaller in lateral width than the 5.25" drives, two filler pieces 115 containing the support brackets 114 and the slots 112 for the 3.5" drive are riveted to the first pair of opposing sides 110 at the location for the 3.5" unit bay in the module. Each drive slides into a unit bay along the appropriate support brackets 114 which also serve to support the weight of the drive. The drive is positioned within the unit bay so that the drive mounting connectors, usually screws, provided by the drive manufacturer fasten into the corresponding slots 112 to hold the drive in place.

An attachment structure on the drive bay module 100 detachably couples the module 100 into a receiving bay in the computer's cabinet. In the alternate embodiment shown in FIG. 1, the attachment structure is constructed by folding the steel on the front of the module 100 to form a flange 130 perpendicular to the sides and by stamping eight openings, or notches, 132 in the flange 130. The placement of the notches 132 correspond to the placement of eight openings positioned around the receiving bay in the computer cabinet (not shown). The fastening openings, i.e., the notches 132 and the openings in the cabinet, are arranged such that they line up when the module 100 is oriented within the receiving bay in any orthogonal position relative to the side panels of the cabinet. This attachment structure detachably couples the drive bay module within the computer cabinet such that the drives within module have a substantially upright orthogonal orientation relative to true vertical and horizontal when the cabinet is oriented vertically or horizontally. This assures that the drives will operate in the position for which they were designed.

The module 100 is secured in the cabinet with reusable fasteners 134. In the embodiment shown in FIG. 1, the reusable fasteners 134 are eight machine screws (type 6–32UNC2AX0.25PPH); in an alternate embodiment not illustrated, the reusable fasteners 134 are bolt-like connectors having an enlarged portion designed to compress and snap into place to secure the module 100 in the cabinet. Such snapping connectors may be released by forcing them back out either by pushing from the inside of the cabinet, or pulling on the heads of the bolt-like connectors.

Other mechanisms for mounting the drive units in the module and for securing the module in the cabinet will be apparent to those skilled in the art, as will the use of alternate materials and manufacturing methods for making the drive bay module, the mounting hardware and the attachment structure.

Figure 2A:
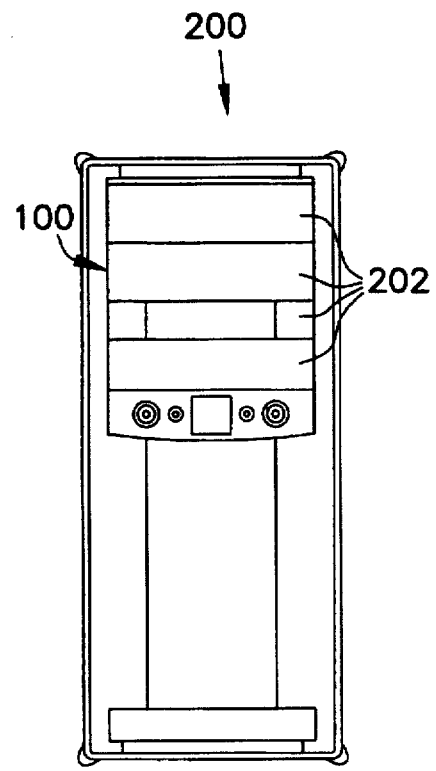
FIG. 2A is a front view of the drive bay module of FIG. 1 mounted in the upper portion of a computer cabinet when the cabinet is positioned vertically.
Figure 2B:
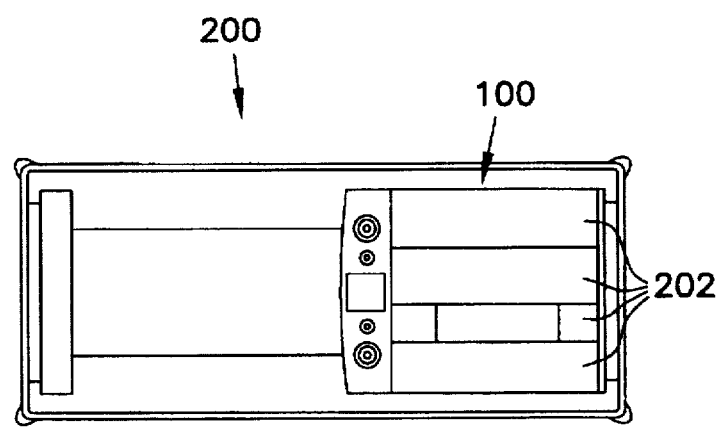
FIG. 2B is a front view of the drive bay module of FIG. 1 mounted in the same computer cabinet as in FIG. 2A when the cabinet is positioned horizontally.
Figure 2C:
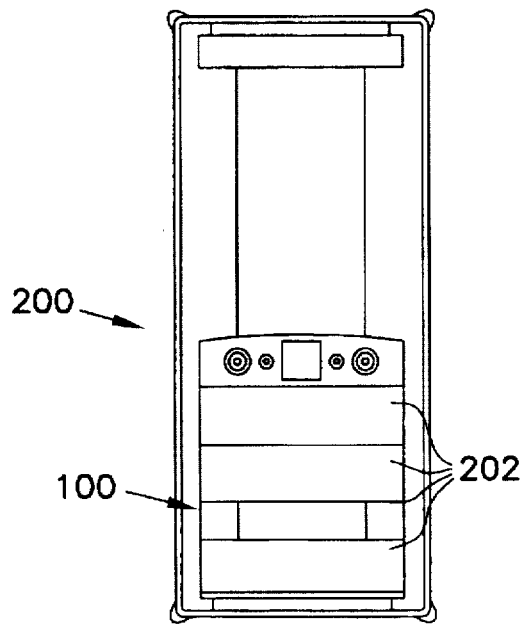
FIG. 2C is a front view of the drive bay module of FIG. 1 mounted in the lower portion of the computer cabinet when the cabinet position is reversed from that shown in FIG. 2A.

A cabinet with a rectangular cross-section and with the receiving bay located adjacent to one of the shorter pair of side panels can be positioned in four different orthogonal orientations. FIGS. 2A, 2B and 2C illustrate three orientations of the computer cabinet 200 with the drive bay module 100 installed: a standard tower unit with the module positioned in the upper portion of the cabinet (FIG. 2A), a desktop model with the module positioned at the right end of the cabinet (FIG. 2B), and a bookshelf tower unit with the module positioned in the lower portion of the cabinet (FIG. 2C). The desk top orientation has a lower profile, but takes up more desk space than either tower orientation. An alternate embodiment configuring the module 100 with four unit bays 202, each of which holds a single drive unit of a certain size; in this case three 5.25" half height form factor unit bays and one 3.5" form factor unit bay, is also shown in FIGS. 2A, 2B and 2C. To support all four orientations, the cabinet itself has its side panels designed to be in contact with an external resting surface such as a table, floor or desk. Other arrangements of unit bays, combinations of form factors, and orientations of the module within the computer cabinet will be apparent to those skilled in the art.

Figure 3A:
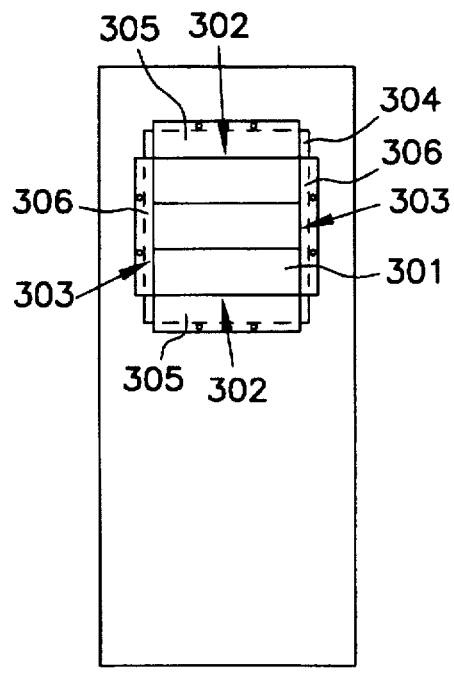
FIG. 3A is a front view of a rectangular version of the drive bay module in FIG. 1 mounted in a square receiving bay in the upper portion of a computer cabinet when the cabinet is positioned vertically.
Figure 3B:
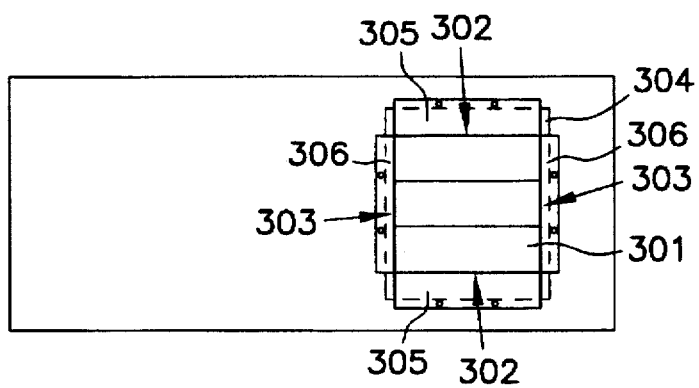
FIG. 3B is a front view of the rectangular version of the drive bay module mounted in the same computer cabinet as in FIG. 2A when the cabinet is positioned horizontally.
Figure 3C:
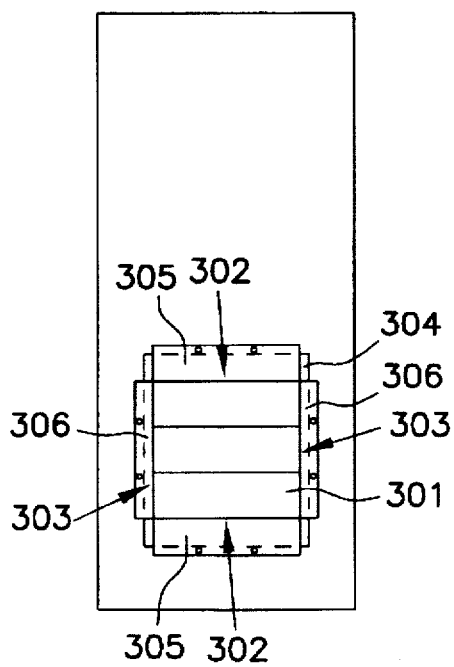
FIG. 3C is a front view of the rectangular version of the drive bay module mounted in the lower portion of the computer cabinet when the cabinet position is reversed from that shown in FIG. 2A.

FIGS. 3A, 3B, and 3C illustrate an alternate embodiment of the drive bay module in which the front opening of the module 301 is substantially rectangular with the longer sides 302 of the module sized to fit into a substantially square mouth 304 of a receiving bay. The portion 305 of the flange that extends from the longer sides 302 of the module is wider than the portion 306 of the flange that extends from the shorter sides 303 in order to overlap the perimeter of the square mouth 304. The rectangular module 301 is secured in place in the receiving bay in the same fashion as the square module and can be positioned in the same orthogonal orientations.

Figure 4A:
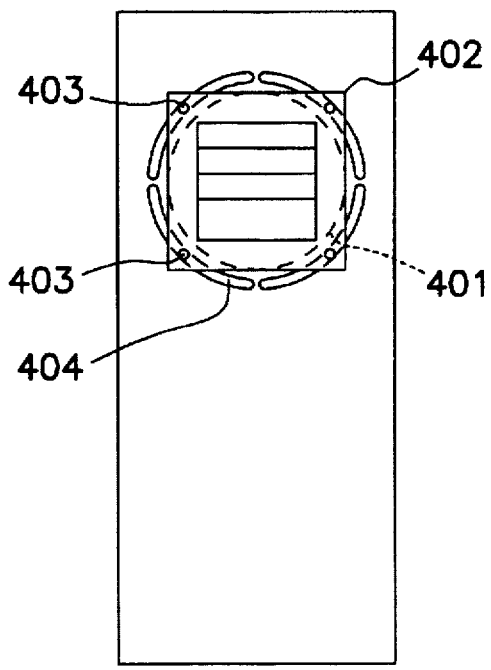
FIG. 4A is a front view of the drive bay module of FIG. 1 mounted in a receiving bay with a circular mouth.
Figure 4B:
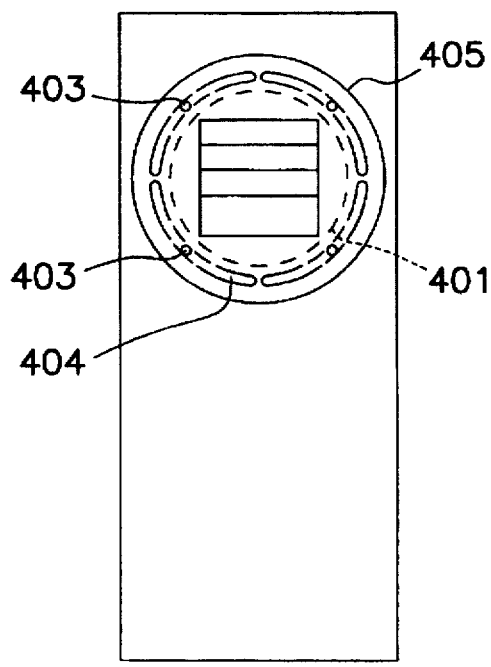
FIG. 4B is a front view of an alternative embodiment of the drive bay module shown in FIG. 4A.

In still another alternate embodiment shown in FIG. 4A, the receiving bay has a substantially circular mouth 401 to permit the drive bay module to be positioned within the bay at any one of a plurality of angles. Either the square drive bay module 100 pictured in FIG. 1 or the rectangular drive bay module 301 pictured in FIGS. 3A, 3B and 3C is positioned within the receiving bay. The flange 402 is shaped as the flange 130 in FIG. 1 but the openings 403 in the flange are positioned at or near the corners of the flange. Alternatively, as shown in FIG. 4B, the flange 405 is circular in shape with the openings 403 positioned along the curve. Arcuate slots 404 in the computer cabinet are arranged around the circular mouth 401 such that the drive bay module can be positioned and secured at any one of a plurality of angles within the mouth. Other shapes for the flange 402 and the slots 404 that permit the module to be positioned at a plurality of angles will be apparent to those skilled in the art.

The drives are coupled to electrical cables inside of the cabinet which in turn are coupled to a system board containing standard personal computer busses, processors, such as a Pentium 133 Mhz processor, and random access memory, as well as VGA cards, modems and other peripheral devices. In one embodiment, the cables are sufficiently long to allow a user to pull the module 100 completely out of the cabinet, rotate it, and insert it back into the cabinet. In some computer systems, the timing, impedance or power level of signals on the electrical cables may not permit a length sufficient to allow the module to be completely pulled out of the cabinet. In that situation, a cover of the cabinet must be removed, and the cables must be disconnected from the drives, then reconnected following rotation of the module. The connectors are designed for ease of connection and reconnection, and are standard connectors as currently used in many personal computers.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A personal computer cabinet including a drive bay module for holding multiple peripheral drive units comprising:

a computer cabinet having side panels;
    a receiving bay with a substantially circular mouth positioned therein, and a plurality of first fastener openings formed adjacent to the receiving bay;

a drive bay module having
    a first pair of substantially parallel plates forming opposing sides of the module and a second pair of substantially parallel plates forming a top and bottom of the module and coupled to the first pair of plates, wherein the module has an open front and back;
    mounting hardware to secure the peripheral drive units within the module, wherein the mounting hardware is positioned on the first pair of plates;
    a flange formed extending perpendicularly outward from the first and second pairs of plates at the front of the module and sized to overlap the perimeter of the mouth of the receiving bay when the module is positioned therein;
    a plurality of second fastener openings in the flange which correspond with the first fastener openings in the computer cabinet when the module is oriented at any one of a plurality of angles within the receiving bay; and a plurality of fasteners insertable into the first and second fastener openings for securing the module within the receiving bay.

2. The personal computer cabinet of claim 1, wherein the flange has a circular perimeter and the plurality of second fastener openings in the flange are arranged along the perimeter.

3. A computer system comprising:

a computer cabinet comprising a front panel and a plurality of adjacently coupled side panels, wherein the cabinet has a receiving bay with a substantially circular mouth positioned therein;

a system board disposed within the computer cabinet and having a bus for transferring data, a processor and a random access memory;

a drive bay module for holding multiple peripheral drive units positioned in the receiving bay including;
    a first pair of substantially parallel plates forming opposing sides of the module and a second pair of substantially parallel plates forming a top and bottom of the module and coupled to the first pair of plates, wherein the module has an open front and back; and
    mounting hardware to secure the peripheral drive units within the module, wherein the mounting hardware is positioned on the first pair of plates;

multiple peripheral drive units disposed within the module;

a plurality of cables connecting the drive units to the bus; and an attachment structure detachably coupling the module within the receiving bay wherein the attachment structure allows the module to be coupled within the receiving bay at plurality of angles.

4. The computer system of claim 3, wherein the attachment structure comprises:

a flange formed extending perpendicularly outward from the first and second pairs of plates at the front of the module and sized to overlap the perimeter of the mouth of the receiving bay when the module is positioned therein;

a plurality of first fastener openings in the computer cabinet formed adjacent the receiving bay;

a plurality of second fastener openings in the flange which correspond with the first fastener openings in the computer cabinet when the module is oriented within the receiving bay at any one of the plurality of angles; and a plurality of fasteners inserted into the first and second fastener openings amd securing the module within the receiving bay.

5. The computer system of claim 4, wherein the plurality of first fastener openings in the computer cabinet comprise arcuate slots.

* * * * *

UNITED STATES PATENT AND TRADEMARK OFFICE
CERTIFICATE OF CORRECTION

PATENT NO. : 5,724,227
DATED : March 3, 1998
INVENTOR(S) : Ronald Hancock et al.

It is certified that error appears in the above-identified patent and that said Letters Patent is hereby corrected as shown below:

At Col. 6, line 57, please delete ";" and insert --:--.

At Col. 7, line 6, please insert "a" before "plurality".

At Col. 8, line 8, please delete "amd" and insert --and--.

At Abstract, line 4, please delete "a" and insert --an--.

Signed and Sealed this

Third Day of November, 1998

*Attest:*

BRUCE LEHMAN

*Attesting Officer*   Commissioner of Patents and Trademarks